US007653382B2

(12) United States Patent
Montes

(10) Patent No.: US 7,653,382 B2
(45) Date of Patent: Jan. 26, 2010

(54) RADIOCOMMUNICATION MODULE EXECUTING A MAIN SOFTWARE AND A CLIENT SOFTWARE COMPRISING SEVERAL CLIENT APPLICATIONS

(75) Inventor: Jacques Montes, Nogent sur Marne (FR)

(73) Assignee: Wavecom, Issy-les-Moulineaux Cedex (FR)

( * ) Notice: Subject to any disclaimer, the term of this patent is extended or adjusted under 35 U.S.C. 154(b) by 1060 days.

(21) Appl. No.: 10/472,333

(22) PCT Filed: Mar. 22, 2002

(86) PCT No.: PCT/FR02/01028

§ 371 (c)(1),
(2), (4) Date: Apr. 2, 2004

(87) PCT Pub. No.: WO02/078376

PCT Pub. Date: Oct. 3, 2002

(65) Prior Publication Data

US 2004/0162103 A1    Aug. 19, 2004

(30) Foreign Application Priority Data

Mar. 22, 2001  (FR) .................................. 01 03909
Oct. 2, 2001   (FR) .................................. 01 12693

(51) Int. Cl.
*H04M 3/00* (2006.01)
(52) U.S. Cl. ..................................... 455/418
(58) Field of Classification Search ............... 455/418, 455/419, 557
See application file for complete search history.

(56) References Cited

U.S. PATENT DOCUMENTS 5,819,115 A * 10/1998 Hoese et al. .................. 710/68

(Continued)

FOREIGN PATENT DOCUMENTS

FR            2 775 550        9/1999

(Continued)

OTHER PUBLICATIONS

Final Office Action from USPTO, dated Aug. 4, 2006 regarding U.S. Appl. No. 10/472,591.

(Continued)

*Primary Examiner*—William D Cumming
(74) *Attorney, Agent, or Firm*—Westman, Champlin & Kelly, P.A.; David D. Brush

(57) ABSTRACT

The invention concerns a radiocommunication module, of the type hosting and executing a main software providing in particular radiocommunication functions and comprising means for executing drive controls, sent to it by at least a driver client software. The invention is characterised in that the radiocommunication module further hosts and executes at least a client software comprising a main client application and at least a secondary (slave) client application. The processing operations carried out by the onboard client software are distributed between the main and secondary client applications. The onboard client application acts: as a driver client software, sending drive controls to the main software, and receiving from it responses, resulting from the execution of some of the drive controls; and/or as a supervising client software, managing the execution of the drive controls sent by an (external) driver client software hosted and executed by a third party equipment co-operating with the radiocommunication module.

26 Claims, 7 Drawing Sheets

U.S. PATENT DOCUMENTS

| | | | |
|---|---|---|---|
| 6,502,124 B1 * | 12/2002 | Shimakawa et al. | 709/203 |
| 6,671,522 B1 * | 12/2003 | Beaudou | 455/558 |
| 2001/0029178 A1 * | 10/2001 | Criss et al. | 455/419 |
| 2004/0152456 A1 * | 8/2004 | Montes | 455/418 |

FOREIGN PATENT DOCUMENTS

| WO | WO 99 63767 | 12/1999 |
|---|---|---|
| WO | WO 00 33538 | 6/2000 |

OTHER PUBLICATIONS

Office Action from USPTO, dated Jun. 1, 2007 regarding U.S. Appl. No. 10/472,591.

Office Action from USPTO, dated Dec. 20, 2006 regarding U.S. Appl. No. 10/472,591.

Office Action from USTPO, dated Feb. 22, 2008 regarding U.S. Appl. No. 10/472,591.

\* cited by examiner

RADIOCOMMUNICATION MODULE EXECUTING A MAIN SOFTWARE AND A CLIENT SOFTWARE COMPRISING SEVERAL CLIENT APPLICATIONS

CROSS-REFERENCE TO RELATED APPLICATION

This Application is a Section 371 National Stage Application of International Application No. PCT/FR02/01028, filed Mar. 22, 2002 and published as WO 02/078376 on Oct. 3, 2002 not in English.

FIELD OF INVENTION

The domain of this invention is radiocommunication systems, and particularly but not exclusively the GSM (Global System for Mobile Communications) standard, DCS 1800 (Digital Cellular System 1800 MHz), PCS 1900 (Personal Communication system), GPRS (General Packet Radio Service) or UMTS (Universal Mobile Telecommunication System).

BACKGROUND OF THE INVENTION

More precisely, the invention relates to a radiocommunication module. Remember that the radiocommunication module is an essential element of a radiotelephone. It hosts and executes a main software (commonly called "radiocommunication software" or "GSM software") that in particular performs wireless communication functions (radiocommunication) and controls various other hardware elements (screen, keyboard, loudspeaker, etc.) of the radiotelephone.

Normally (first application), the radiocommunication module is included in a terminal (or ME for "Mobile Equipment") that cooperates with a SIM (Subscriber Identity Module) card.

Other applications are now envisaged for the above mentioned radiocommunication module.

In particular, it has been proposed to integrate the radiocommunication module in devices other than radiocommunication terminals but that still require a wireless communication function (second application). For example, telemetry devices (for reading meters), alarm devices or bank card readers.

It has also been proposed to supply the radiocommunication module in independent form (third application); it is then qualified as a modem. This type of modem does not contain any hardware man-machine interface element (screen, keyboard, loudspeaker, etc.). It is designed to cooperate with a terminal equipment (supporting a client software), that does have hardware man-machine interface elements. In particular, but not exclusively, the terminal equipment may be a micro-computer. In general, the terminal equipment hosts and executes a client driver software that controls the radiocommunication module, using a set of driver commands in the AT format. The AT (for ATtention command) commands enable the Terminal Equipment (TE) to request the radiocommunication terminal to which it is connected to perform some predetermined actions. To achieve this, the main software (hosted on the radiocommunication module) comprises means of executing AT commands sent to it by the client driver software (hosted on the terminal equipment).

For further information about AT commands, refer firstly to the ETSI "GSM 07.05" and "GSM 07.07" standards, and secondly to the ITU-T recommendation V25ter which are inserted herein by reference.

In general, a radiocommunication module can be driven by a terminal equipment using AT commands not only within the framework of the above mentioned third application (radiocommunication module forming a modem), but also within the context of the first and second applications mentioned above (radiocommunication module included in a radiocommunication terminal or other system).

In other words, regardless of what application is envisaged, the radiocommunication module may be driven by a terminal equipment with which it cooperates (usually through a serial link). In this case, a client driver software (comprising a "client external application"), hosted and executed by the terminal equipment, sends AT commands to a main software, hosted and executed by the radiocommunication module, so that the radiocommunication module can execute them.

As shown in FIG. 2, operation of the existing technique used for terminal equipment to drive a radiocommunication module may be summarized as follows:

step "1": the client external application (client driver software) 2 sends an AT command;
step "2": the serial link 5 transmits the AT command to the AT command execution means 4 included in the main software 3 hosted and executed by the radiocommunication module 1;
step "3": the execution means 4 execute the AT command;
step "4": after execution, the execution means 4 send an AT response to the client external application 2;
step "5": this response is sent through the serial link 5;
step "6": the client external application 2 receives the response.

Each of these steps is shown in FIG. 2 by a circle in which the number of the step concerned is entered. The same convention is adopted in the following figures related to this invention (and that are described in detail in the remainder of the description).

The existing technique for driving a radiocommunication module by terminal equipment has several disadvantages.

Firstly, it requires two sets of resources (processor and memory). The radiocommunication module comprises a processor and a memory (first set of resources) and the terminal equipment also has a processor and a memory (second set of resources). Therefore, the existing technique mentioned above is expensive in terms of equipment and energy consumption.

Another disadvantage of the above mentioned existing technique is that the radiocommunication module is entirely driven by the terminal equipment. The client driver software hosted on and executed by the terminal equipment is the "master", while the main software hosted and executed by the radiocommunication module, is the "slave".

In order to overcome these disadvantages with the state of the art, the applicant (Wavecom Company) deposited a French patent application No. FR 0103909 on Mar. 22, 2001 entitled "Radiocommunication module hosting and executing a client software, and corresponding process for use of a client driver software". This application FR 0103909, the texts and the drawings of which are inserted herein by reference, proposes a new technique for driving a radiocommunication module consisting of hosting at least one client software on the radiocommunication module to act as a client driver software and/or to act as a client supervision software.

Thus, if the client embedded software acts as a client driver software, the radiocommunication module operates independently and inexpensively. In this case, the radiocommunication module does not need to cooperate with a terminal equipment, and the main software and the client driver software use the same resources (same processor and same memory).

Furthermore, if the client embedded software acts as the client supervision software, the radiocommunication module is not restricted to acting as a slave with respect to the terminal equipment that executes the client driver software. The client supervision software is executed by the radiocommunication module, and manages the driving requested by the client driver software and executed by the terminal equipment. In this case, it will be noted that the client embedded software is software that is additional to the state of the art configuration mentioned above. However, this additional software is inexpensive because it uses the same resources (processor and memory) as the main software also hosted by the radiocommunication module.

In one preferred embodiment of the new technique mentioned above:
- the main software comprises particularly a binary file containing the main application;
- the client software comprises particularly a first binary file containing the client application, and a second binary file (for example in the form of a previously compiled library) containing an interface application between source functions associated with the client application, and execution functions associated with the main application.

This new technique for driving a radiocommunication module may be seen as a software platform, to enable clients to develop their own client applications and to download them in radiocommunication modules.

In the preferred embodiment mentioned above, the main software and the interface application are "proprietary" binary files developed by the radiocommunication module manufacturer, while the client application is a "client" binary file developed by the client.

Remember that the process for development of a binary file comprises the following steps:
- write source files, for example in the "C" language;
- compile these source files, so as to generate object files (in machine language for the microprocessor located on the radiocommunication module);
- link edit the object files (compiled source files) so as to generate a binary file (that is then downloaded in the radiocommunication module).

In the context of the above-mentioned new technique for driving a radiocommunication module, the purpose of this invention is to facilitate the task of the client in the development process of a client application.

Another purpose of the invention is to propose a simple and efficient solution to dialogue problems between applications (main and secondary client) that result from use of the general concept of this invention.

We will now briefly mention two known techniques of solving dialogue problems between two applications, with the disadvantages of each.

According to a first known technique, dialogue problems between two software applications are solved during link editing. But this makes it necessary to know all dialogue points. Furthermore, exchanging all dialogue source functions between two applications makes it necessary for each application to adapt to the other. The result is that the developer of one application (secondary application) must write a different version of this application for each client that wants to integrated it into his applications (main applications).

A second known technique of solving dialogue problems between two applications consists of using mechanisms such as dynamic link editing. With this type of mechanism, only the functions actually used have to be loaded into memory. For example, this technique may be DLL (Dynamic Link Library) used in Windows (registered trademark). Unfortunately, this technique requires large amounts of memory and is unsuitable for use when there are severe constraints in terms of CPU, memory and real time in radiocommunication modules.

SUMMARY OF THE INVENTION

These various objectives, and others that will become clear later, are achieved according to the invention using a radiocommunication module of the type hosting and executing a main software that in particular performs radiocommunication functions, the said main software comprising means of executing driver commands sent to the main software by at least one client driver software and belonging to a predetermined set of driver commands. According to the invention, the said radiocommunication module also hosts and executes at least one client software, called the client embedded software, comprising a client main application and at least one client secondary application, slave of the client main application, the processing done by the said client embedded software being distributed between the said client main application and the said at least one client secondary application. The client embedded software and the main software comprise means of enabling the client embedded software to perform at least one of the following two roles:
- the role of a client driver software sending driver commands to the main software, and receiving responses from the main software resulting from the execution of some of the driver commands,
- the role of a client supervision software, managing execution of driver commands sent by a client driver software, called the client external software, hosted on and executed by terminal equipment cooperating with the radiocommunication module.

Therefore, this invention is in the context of the above mentioned new technique for control of radiocommunication module, according to which the radiocommunication module hosts and executes a client software that can act as a client driver software and/or a client supervision software.

In this context, the general aim of the invention consists of using a client "multiblock" application comprising a client main application combined with one or several client secondary application(s), rather than a client "monoblock" application. Each client secondary application is a slave application of the client main application that calls it, in terms of starting and stopping. But once it has been started, the client secondary application can access all execution functions made available by the main software (through a subscription mechanism to a service for sending messages from the main software that will be described later), completely independently of the client main application.

Client secondary applications are "elementary blocks" that may be supplied to clients by a third party developer (typically the manufacturer of the radiocommunication module). Thus, the development work done by the client is reduced because all he develops is the "client main application" that subcontracts some processing by calling one or more client secondary applications.

Note that the client can also develop client secondary applications himself, if he would like to call them in the different client main applications that he is developing.

In a first preferred embodiment of the invention, the said client software comprises a binary file containing the said client main application and the said at least one client secondary application.

In this case, the client secondary application is preferably supplied in the form of an object file. Thus, the source file is not provided, in order to protect the proprietary (or third party) know how. The object file containing the client secondary application must be link edited with the object file(s) containing the client main application, and the binary file resulting from this link editing is downloaded into the module.

In a second preferred embodiment of the invention, the said client software comprises a first binary file containing the said client main application, and at least one second binary file, each containing at least one client secondary application.

In this case, the client secondary application is supplied in the form of a binary file. Thus, as in the other case, the source file is not communicated in order to protect proprietary (or "third party") know how. The binary file containing the client secondary application may be downloaded directly into the module.

Preferably, the following features are provided to enable the client embedded software to act as client driver software:
  the client embedded software comprises means of sending driver commands to execution means included in the main software;
  the main software comprises means of sending responses resulting from the execution of some driver commands by the execution means included in the main software, to the client embedded software;
  the client embedded software comprises means of processing responses sent to it by the main software.

Preferably, the following features are provided to enable the client embedded software to act as client supervision software
  the main software comprises means of preparsing commands as a function of a determined preparsing policy, so as to transmit driver commands from the client external software to the client embedded software and/or to execution means contained in the main software;
  the client embedded software includes means of processing driver commands switched to it by the said preparsing means.

In this way, the client embedded software can:
  either do nothing, the commands being sent only to the main software, which executes them directly;
  or filter commands transmitted to it without being executed by the main software. For example, the client embedded software may thus decide which commands should be executed by the main software and the commands for which a response should be made without execution, as a function of determined criteria;
  or "spy" commands that it receives a copy of, and which are also executed directly by the main software.

Advantageously, the client embedded software comprises means of selecting the preparsing policy applied by the said preparsing means, among a set of preparsing policies such as:
  driver commands originating from the client external software are sent only to execution means within the main software;
  driver commands originating from the client external software are sent only to the client embedded software;
  driver commands originating from the client external software are sent to the execution means included in the main software and to the client embedded software.

Advantageously, the said command processing means take at least one decision for each command, belonging to the group including:
  send the driver command to the execution means included in the main software, the client embedded software comprising means of sending driver commands to the execution means for this purpose;
  supply or do not supply a response, only as a function of at least one item of information about the command, without executing the command, the client embedded software comprising means of sending the response to the client external software for this purpose through the main software.

Advantageously, to enable the client embedded software to act as client supervision software:
  the main software comprises means of preparsing responses as a function of a determined response preparsing policy, so as to transmit responses resulting from the execution of some driver commands by execution means included in the main software, to the client embedded software and/or to the client external software;
  the client embedded software comprises means of processing responses switched to it by the said response preparsing means.

In this way, the client embedded software can:
  either not take any action, responses generated by the main software being transmitted only to the client external software;
  or filter responses transmitted to it without being transmitted to the client external software. For example, the client embedded software can thus decide what responses should be sent to the client external software (modified or not modified) as a function of defined criteria, and what responses should not be transmitted to this client external software;
  or "spy" responses of which it receives a copy and which are also sent directly to the client external software.

Advantageously, the client embedded software comprises means of selecting the response preparsing policy applied by the said response preparsing means, among a set of response preparsing policies such as the following:
  responses originating from execution means are transmitted only to the client external software;
  responses originating from execution means are transmitted only to the client embedded software;
  responses originating from execution means are transmitted to the client embedded software and to the client external software.

Preferably, the said radiocommunication module is included within a device belonging to the following group:
  radiocommunication terminals;
  devices other than radiocommunication terminals necessitating a wireless communication feature;
  modems.

Preferably, the said main software comprises at least one main application associated with a set of execution functions, each enabling the execution of at least one of the said driver commands. Each of the said client main and secondary applications is associated with a set of source functions, each enabling sending or receiving driver commands or responses to driver commands, to or from the main application. The main software and/or the said client embedded software comprise an application interface used to interface the said source functions with the said execution functions.

The result is to limit development costs, due to the fact that the interface application (also called the application interface library in the following) can be used with different client applications (main applications), or even with different main software, once it has been developed.

In one advantageous embodiment of the invention, the set of source functions associated with the client main application in particular comprises a client main application initialisation source function that is called when the radiocommunication module is started.

Preferably, the set of source functions associated with the client main application comprises a source function for subscription to a service for sending messages originating from the main software. At the time of this subscription, the client main application sends the address of a message processing source function in which the client main application would like to receive messages from the main software, to the main software.

This subscription mechanism to a service for sending messages originating from the main software enables the client main application to call all execution functions provided by the main software, while being able to receive messages sent by the main software for execution of these functions.

Preferably, the set of source functions associated with the client secondary application comprises in particular a source function for initialisation of the client secondary application that is called by the client main application.

Preferably, the set of source functions associated with the client secondary application comprises a source function for subscription to a service for sending messages originating from the main software. At the time of this subscription, the client secondary application sends the address of a source message processing function to the main software, in which the client secondary application would like to receive messages originating from the main software.

Advantageously, the said source initialisation function of the client secondary application comprises at least one parameter enabling the use of a dialogue mechanism between the client main application and the client secondary application.

Preferably, the set of source functions associated with the client secondary application also comprises a source function for stopping the client secondary application called by the client main application.

Preferably, the set of source functions associated with the client secondary application comprises a source function for unsubscription from the said service for sending messages originating from the main software.

In this manner, the client main application only needs to know this dialogue point (source function for initialisation of the client secondary application) and its corresponding function described below (source function for stopping the client secondary application). Therefore, it is a simple and efficient solution to dialogue problems between a client main application and a client secondary application. The developer of a client secondary application does not need to write one version for each client that wants to integrate it into its client main applications. All he needs to do is to inform him about the two dialogue points mentioned above.

Note that it is important to avoid two developers of client secondary applications from using identical dialogue points. For example, this can be achieved if each developer asks a central service for a unique identifier for each client secondary application that he would like to develop.

Furthermore, the dialogue mechanism between the client main application and the client secondary application enables the client secondary application to notify the client main application about the execution results of its task(s). The dialogue may be two directional or single-directional.

Advantageously, the said message type belongs to the group comprising:

message containing a response to a driver command previously sent to the main software by the client embedded software;

message containing an unsolicited driver command;

message containing a driver command sent by a client external software through the main software;

message containing a response resulting from execution of a driver command sent by the client external software, by the main software;

message sent on expiration of a timeout.

In one preferred embodiment of the invention, the said set of driver commands is a set of standard AT commands. This enables fast development of the client embedded software, since AT commands are well known and are already used for the development of client external software (hosted on the terminal equipment). This also facilitates development of a client software strongly based on an existing client external software.

The invention also relates to a process for implementation of a client software for the control of a radio communication module, the said radiocommunication module being of the type that hosts and executes a main software particularly performing radiocommunication functions, the said main software comprising means of executing driver commands sent to the main software by the said client driver software and belonging to a predetermined set of driver commands. According to the invention, the said radiocommunication module hosts and also executes at least one client software, called the client embedded software, comprising a client main application and at least one client secondary application, slave of the client main application, the processing done by the said client embedded software being distributed between the said client main application and the said at least one client secondary application. The client embedded software and the main software dialogue with each other such that the client embedded software performs at least one of the following two roles:

the role of the said client driver software to send driver commands to the main software, and to receive responses following execution of some of the driver commands from the main software;

the role of a client supervision software, managing execution of driver commands sent by the said client driver software, the said client driver software called the client external software being hosted on and executed by terminal equipment cooperating with the radiocommunication module.

BRIEF DESCRIPTION OF THE DRAWINGS

Other characteristics and advantages of the invention will become clear after reading the following description of a preferred embodiment of the invention given as a non-limitative example, and the attached drawings, in which.

DETAILED DESCRIPTION OF THE PREFERRED EMBODIMENTS

Figure 1:
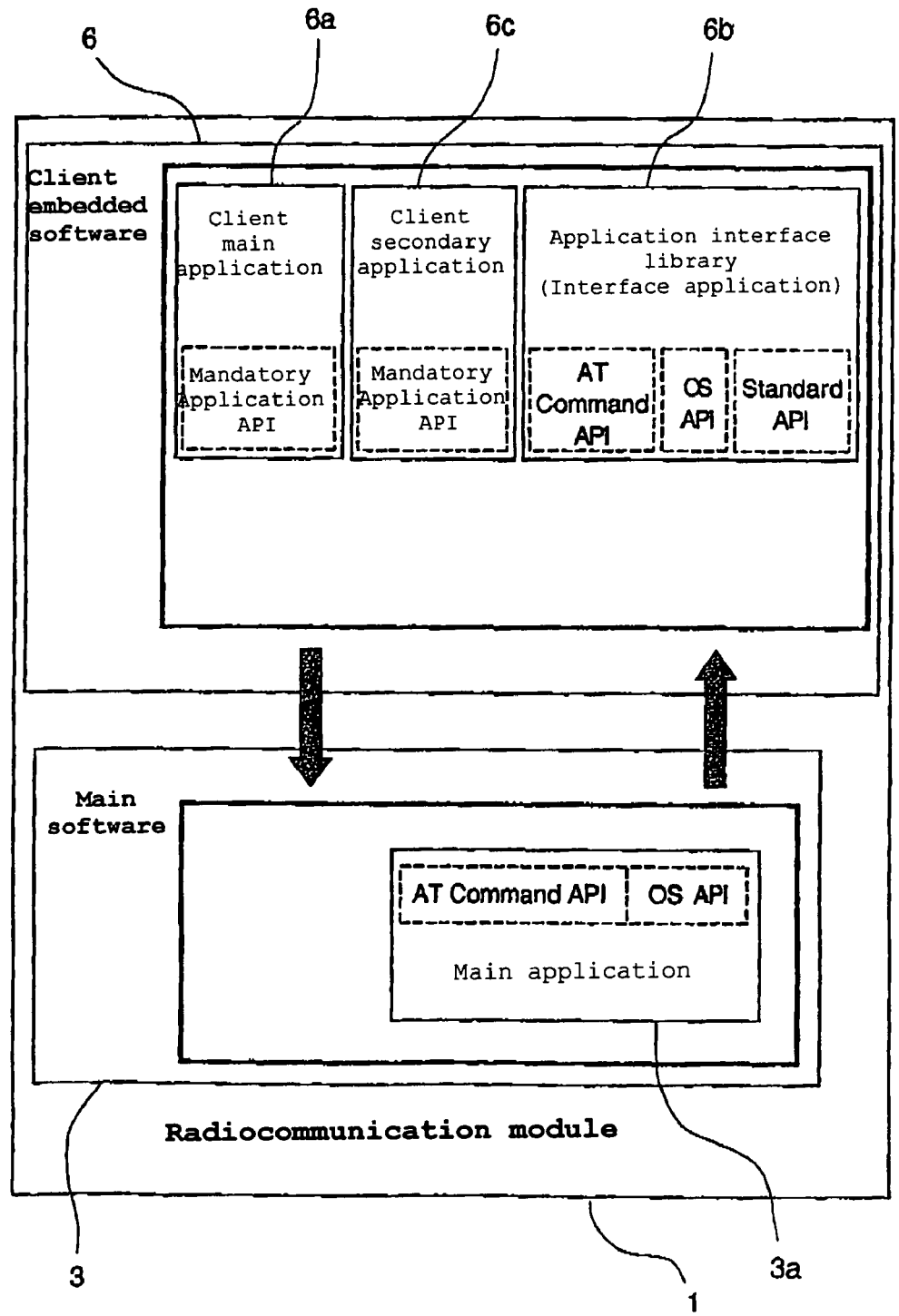
FIG. 1 shows a simplified diagram of a particular embodiment of a radiocommunication module according to this invention, showing the client main application and the client secondary application.
Figure 7:
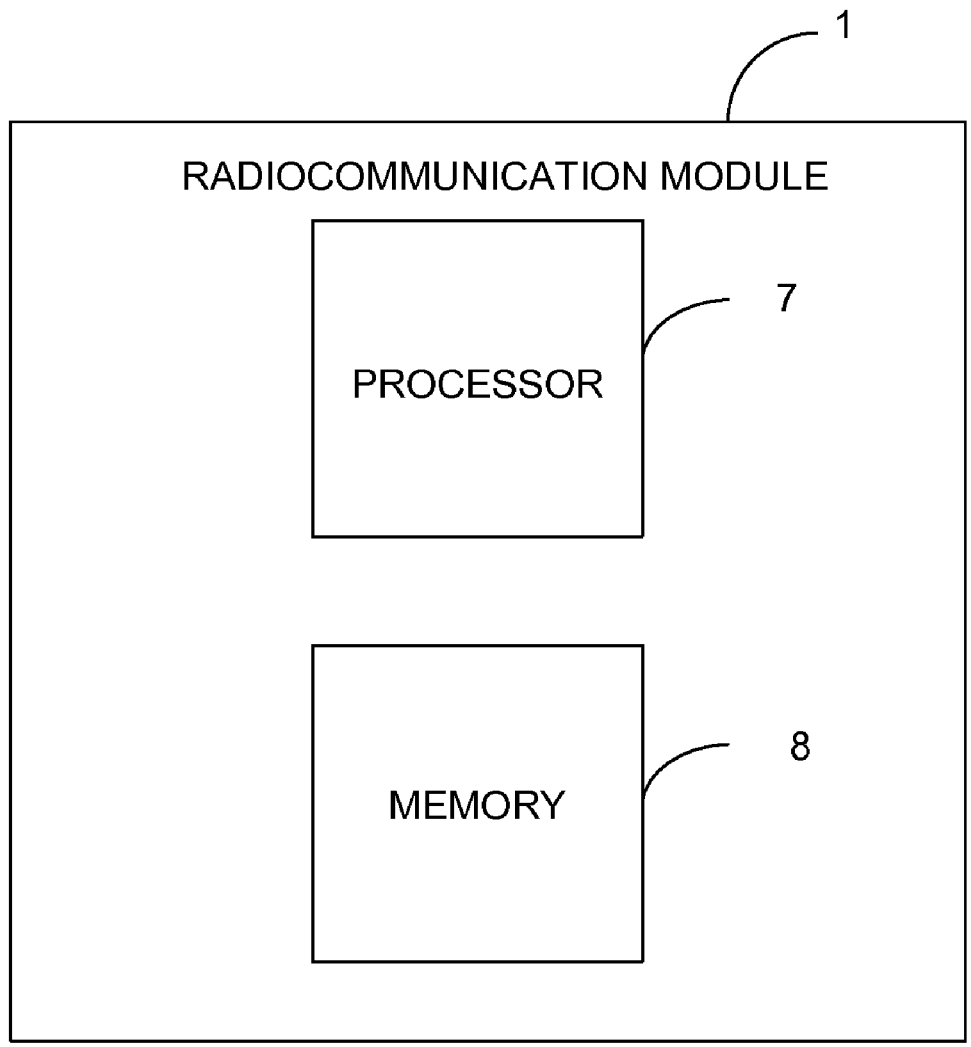
FIG. 7 shows a simplified block diagram of the radiocommunication module shown in FIG. 1.

Therefore, the invention relates to a radiocommunication module 1 hosting and executing a main software 3 and at least one client embedded software 6, using the same set of resources (processor 7 and memory 8), as shown in FIGS. 1 and 7.

Conventionally, in particular the main software (for example a "GSM software") performs radiocommunication functions and comprises means of executing driver commands (sent to it by a client driver software).

The client embedded software (concept specific to this invention) can act as:
a client driver software, and/or
a client supervision software.

In the remainder of this description, it is assumed that the driver commands are AT commands. However, it is clear that this invention is not restricted to this type of driver command.

In the particular embodiment shown in FIG. 1, the main software 3 comprises a main application 3a based particularly on a set of execution functions, each enabling the execution of at least one AT command.

Furthermore, the client embedded software 6 comprises:
a client main application 6a, associated with a set of source functions, each enabling sending AT commands to a main application 3a, or receiving AT commands from this application;
a client secondary application 6c, also associated with a set of source functions like those mentioned above;
an interface application 6b, enabling interfacing of source functions (from the client main application 6a and the client secondary application 6c) with execution functions (of the main application 3a).

Thus, the client main application 6a communicates with the main application 3a through the interface application 6b. Similarly, the client secondary application 6c communicates with the main application 3a through the interface application 6b.

Consequently, each application (main 6a, secondary 6c and interface 6b) comprises an "API" (Application Programming Interface). Note that an API is a description of communication rules corresponding to a specific functional assembly.

The client main application 6a comprises an "Application Mandatory API" block forming an interface describing functions that will have to be defined in the client main application.

The client secondary application 6c also comprises an "Application Mandatory API" block (partially identical to the block with the same name included in the client main application) forming an interface describing functions to be defined in the client secondary application.

The interface application (or the application interface library) 6b, comprises the three following blocks:
an "AT command API" block forming an interface describing access to ATI commands, this interface describes functions located in the application interface library;
an "OS API" block forming an interface describing access to operating system functions, this interface describes functions located in the application interface library;
a "Standard API" block forming an interface describing the access to standard functions, this interface describes functions located in the application interface library.

In the main software 3, the main application 3a comprises:
an "AT command API" block, similar to the block with the same name included in the interface application 6b;
an "OS API" block, similar to the block with the same name included in the interface application 6b.

The main application 3a forms the core of the main software 3, and the client main application 6a, the client secondary application 6c, and the interface application 6b form the kernel of the client embedded software 6.

For example, the interface application 6b may be a binary file in the form of a previously compiled library.

The client main application 6a is a binary file resulting from link editing between a plurality of object files (themselves resulting from compilation of source files).

The following two variants may be considered for the client secondary application 6c:
either it is supplied in the form of an object file and in this case the object file is taken into account at the time of link editing to generate the binary file containing the client main application 6a. In other words, a particular binary file contains the client main application and the client secondary application;
or it is supplied directly in the form of a binary file. In other words, the client main application 6a and the client secondary application 6c are contained in two distinct binary files.

The client embedded software 6 and the main software 3 each use a distinct part of the same RAM. The client defines the size of the memory stack necessary for correct execution of the client embedded software. An attempt by one of the two software programs to access part of the RAM reserved for the other software will stop operation.

Figure 3:
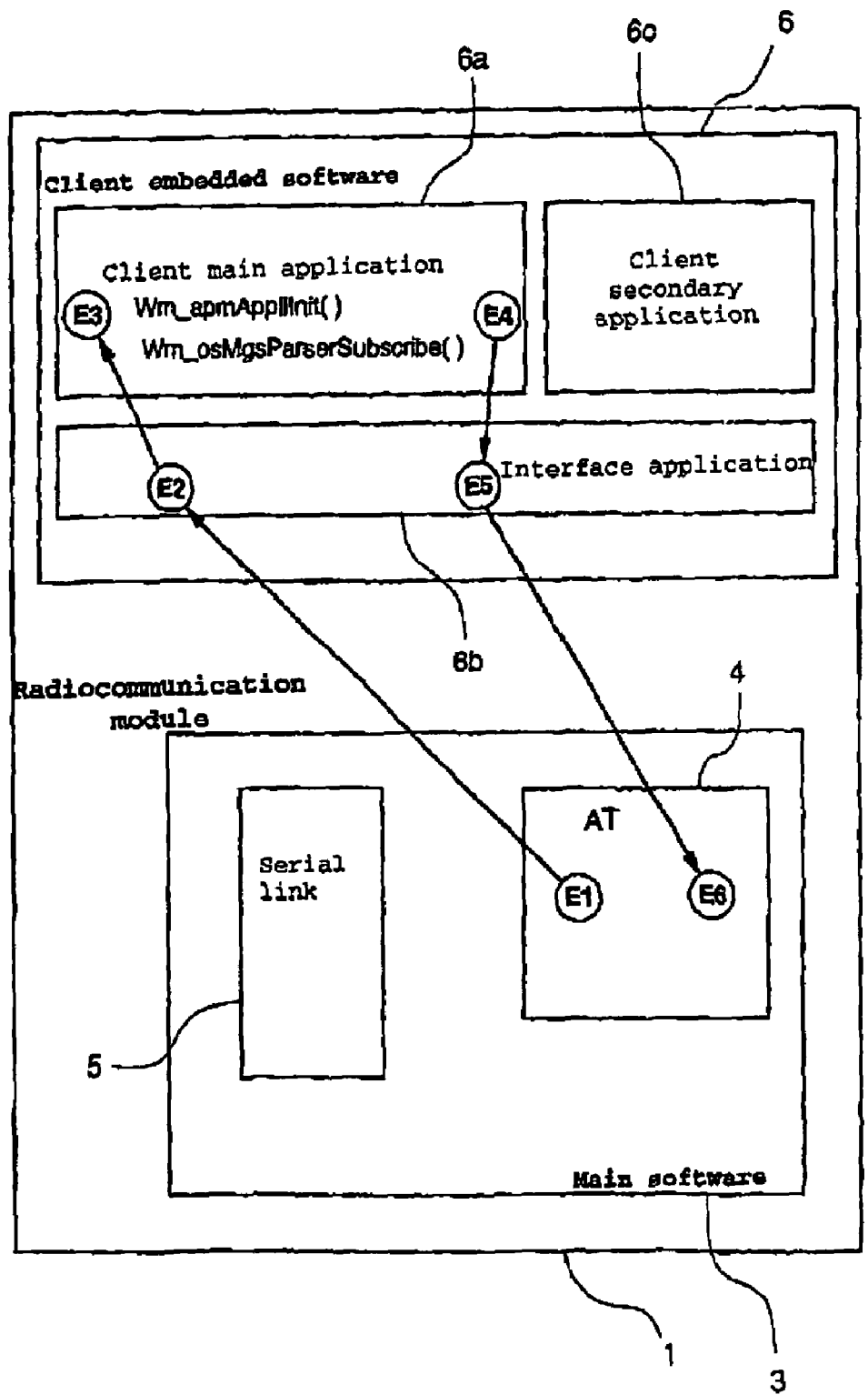
FIG. 3 shows a mechanism for starting the client main application and subscription of this application to a service for sending messages originating from the main software.

We will now present a mechanism for starting the client main application 6a and subscription of this application to a service sending messages originating from the main software 3, with reference to FIG. 3.

Figure 2:
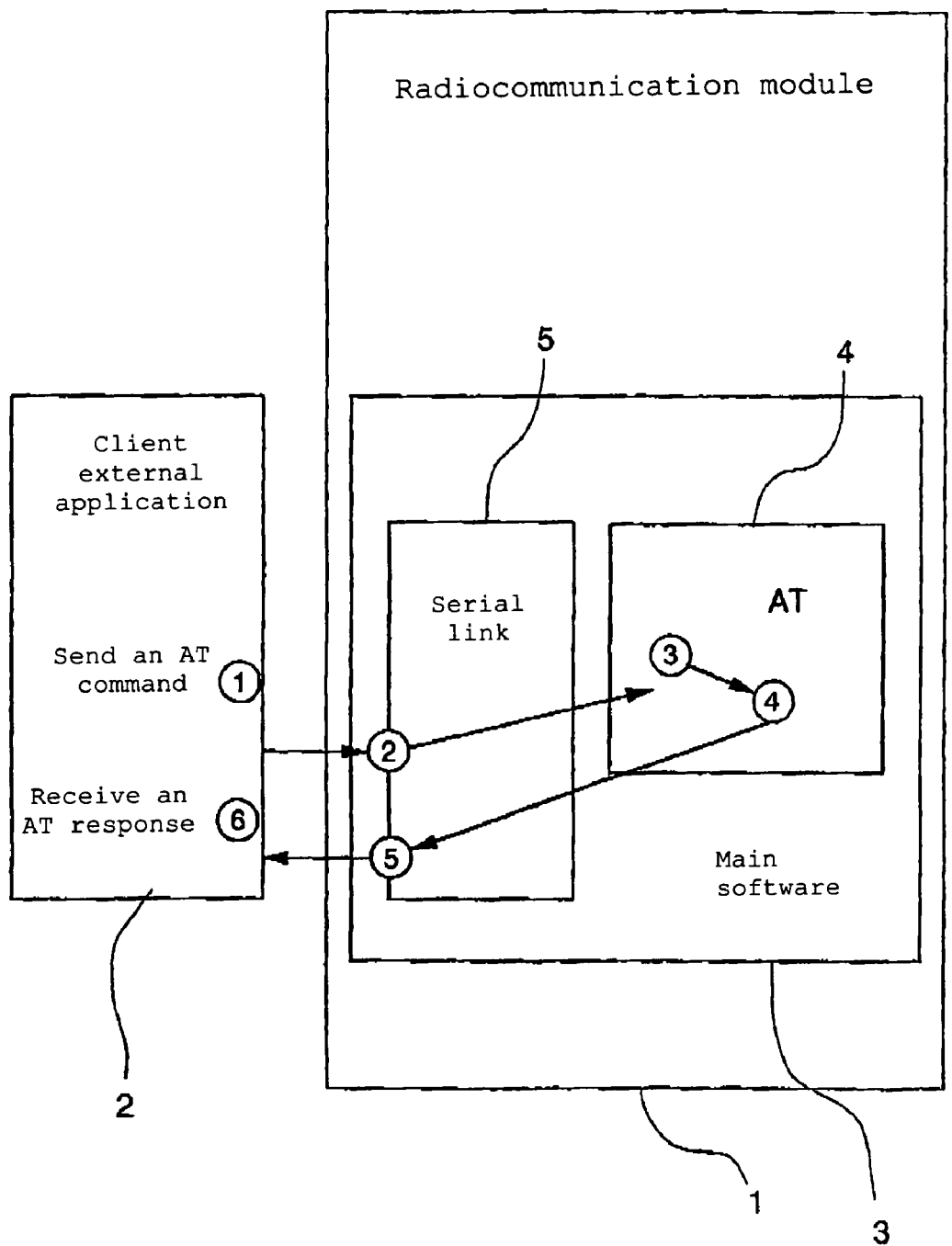
FIG. 2 (prior art) shows operation of the existing technique for driving a radiocommunication module by terminal equipment.

Elements conventionally included in a radiocommunication module and described above with reference to FIG. 2 (prior art) have the same numeric references. Thus, the radiocommunication module 1 hosts and executes a main software 3 in particular comprising means of executing AT commands.

Furthermore, according to the invention and as presented above with reference to FIG. 1, the radiocommunication module 1 hosts and also executes a client embedded software 6 that acts as client driving software or client supervision software, and in particular comprises a client main application 6a, a client secondary application 6c and an interface application 6b.

Operation of this mechanism to start the client main application and to subscribe it to a service for sending messages may be summarized as follows:
step "1": the main software 3 detects the presence of a client main application 6a and starts it;
step "2": the client main application 6a is started through the interface application 6b, which calls a source function for initialization of the client main application 6a, within the client main application 6a. This source function ("wm_apmAppliInit") is presented in detail in the remainder of the description;

step "3": within the client main application 6a, the "wm_apmAppliInit" source function initialises the client main application. As explained in detail in the following steps ("4" to "6"), this initialisation consists particularly of providing the main software 3 with the address of a source function (for example "wm_apmAppliParser") so that the client main application 6a can receive messages originating from the main software;

step "4": the client main application 6a calls a source function for subscription to a service for sending messages originating from the main software ("wm_osMsgParserSubscribe"). This source function is described in detail in the remainder of the description;

step "5": the interface application 6b calls the appropriate execution function(s) for registering the subscription to the service for sending messages to the client main application 6a, within the main software 3;

step "6": the main software 3 produces the registration requested by the client main application 6a through the interface application 6b.

According to one variant, the client main application 6a calls the "wm_osMsgParserSubscribe" source function whenever it wishes (independently of the execution of the source initialisation function of the client main application 6a).

Figure 4:
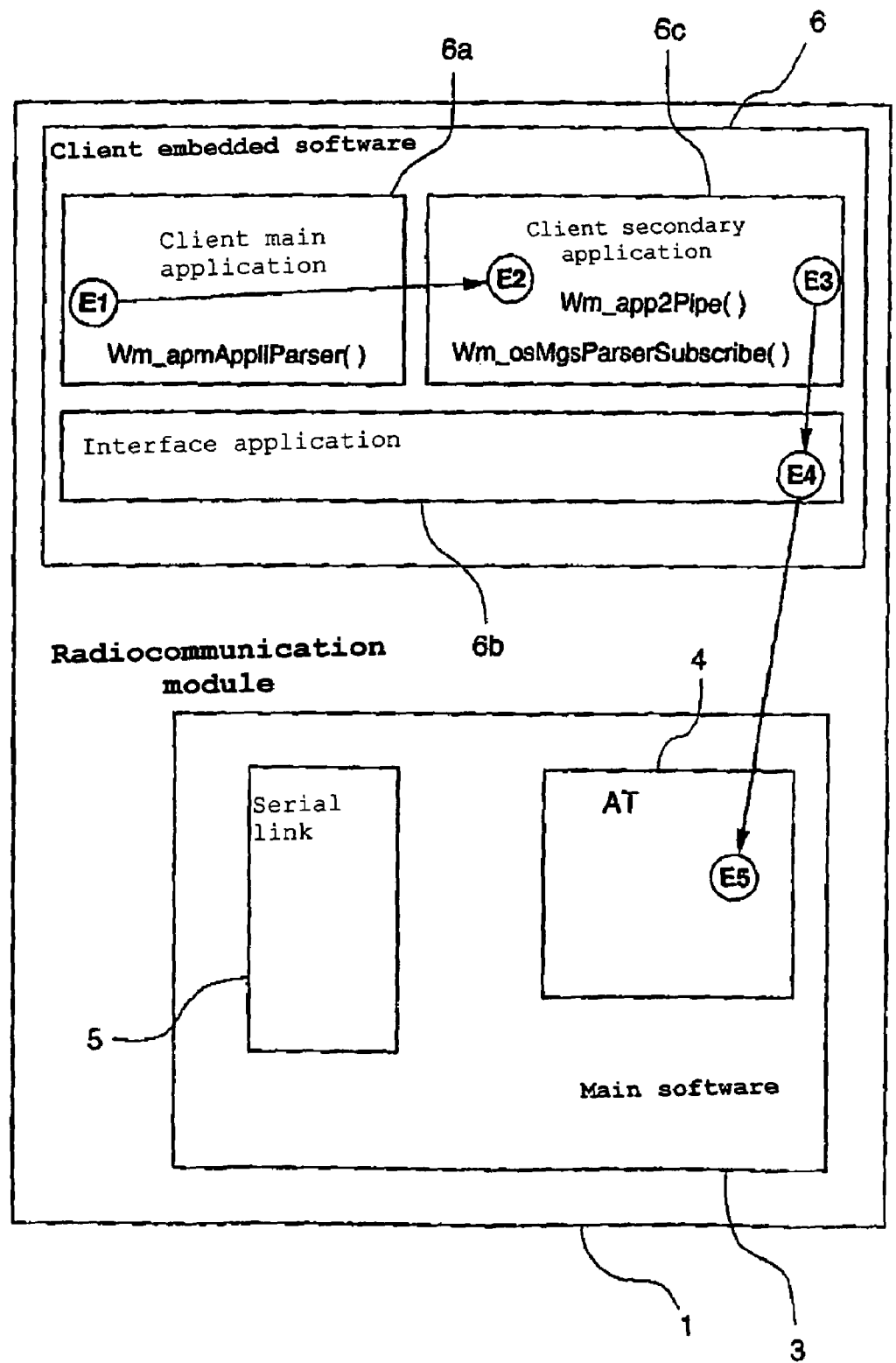
FIG. 4 shows a mechanism for starting the client secondary application and subscription of this application to a service for sending messages originating from the main software.

We will now present a mechanism for starting the client secondary application 6c and for subscribing it to a service for sending messages from the main software 3, with reference to FIG. 4.

Operation of this mechanism can be summarized as follows:

step "1": after receiving a message in its-source function "wm_apmAppliParser( )", the client main application 6a calls a source function of the client secondary application 6c, namely the source function to initialise the client secondary application 6c ("wm_app2Pipe(init)"). This source function (which must be known to the client main application 6a) is described in detail in the remainder of the description;

step "2": the source function "wm_app2Pipe(init)" within the client secondary application 6c, initialises the client secondary application 6c. As explained in detail in the following steps ("3" to "5"), this initialisation consists particularly of providing the main software 3 with the address of a source function (for example "wm_app2MsgParser") that the client secondary application 6c uses to receive messages originating from the main software 3;

step "3": the client secondary application 6c calls the source function for subscription to a service for sending messages originating from the main software ("wm_osMsgParserSubscribe"). This source function is presented in detail in the remainder of the description;

step "4": the interface application 6b calls the appropriate execution function(s) within the main software 3, to register the subscription to the service for sending messages addressed to the client secondary application 6c;

step "5": the main software 3 generates the registration requested by the client secondary application 6c, through the interface application 6b.

After the client secondary application 6c has been started in this way, it performs its function (set of processing or tasks) independently of the client main application 6a. As described in detail below, it uses the set of execution functions provided by the main software 3 for this purpose.

According to one variant, the client secondary application 6c calls the "wm_osMsgParserSubscribe" source function whenever it wishes (independently of execution of the source function to initialise the client secondary application 6c).

Note that the source initialisation function of the client secondary application may comprise at least one parameter for implementing a dialogue mechanism between the client main application 6a and the client secondary application 6c. This characteristic of the invention is described in detail in the remainder of the description.

Figure 5:
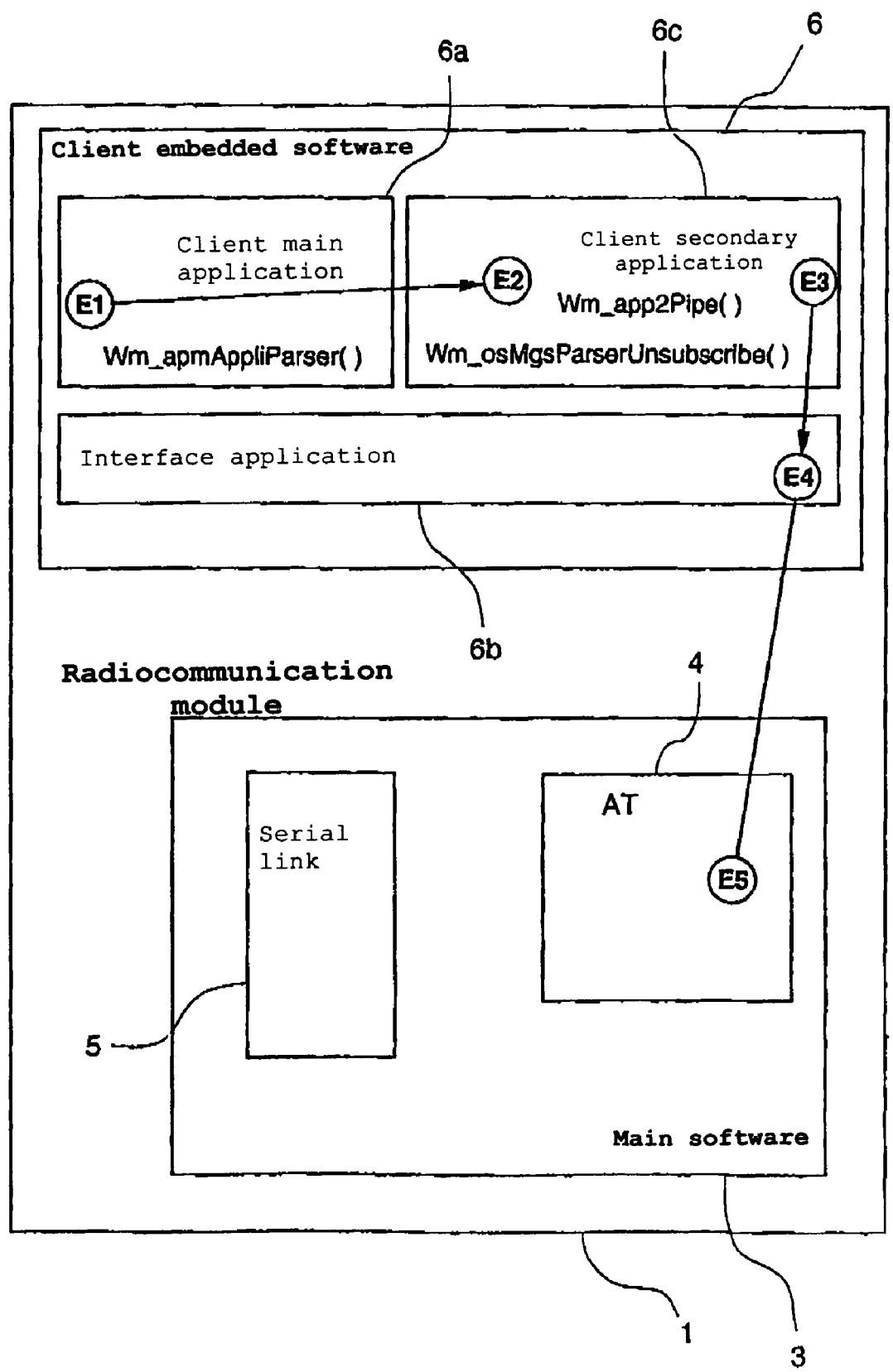
FIG. 5 shows a mechanism for stopping a client secondary application and for unsubscribing this application from the service for sending messages originating from the main software.

We will now describe the mechanism for stopping the client secondary application 6c and unsubscribing it from the service for sending messages originating from the main software 3, with reference to FIG. 5.

The operation of this mechanism may be summarised as follows:

step "1": after receiving a message in its source function "wm_apmAppliParser( )", the client main application 6a calls a source function of the client secondary application 6c, namely the source function to stop the client secondary application 6c ("wm_app2Pipe(stop)") This source function (which must be known to the client main application 6a) is described in detail in the remainder of the description;

step "12": the source function "wm_app2Pipe(stop)" within the client secondary application 6c, carries out processing to stop the client secondary application 6c. As explained in detail in the following steps ("3" to "5"), for the client secondary application 6c this processing consists particularly of unsubscribing from the service to send messages originating from the main software 3;

step "3": the client secondary application 6c calls the source function for unsubscribing from the service for sending messages originating from the main software ("wm_osMsgParserUnsubscribe"). This source function is presented in detail in the remainder of the description;

step "4": the interface application 6b within the main software 3 calls the appropriate execution function(s), called the unsubscription function(s), from the service for sending messages addressed to the client secondary application 6c;

step "5": the main software 3 stops the registration requested by the client secondary application 6c, through the interface application 6b.

Figure 6:
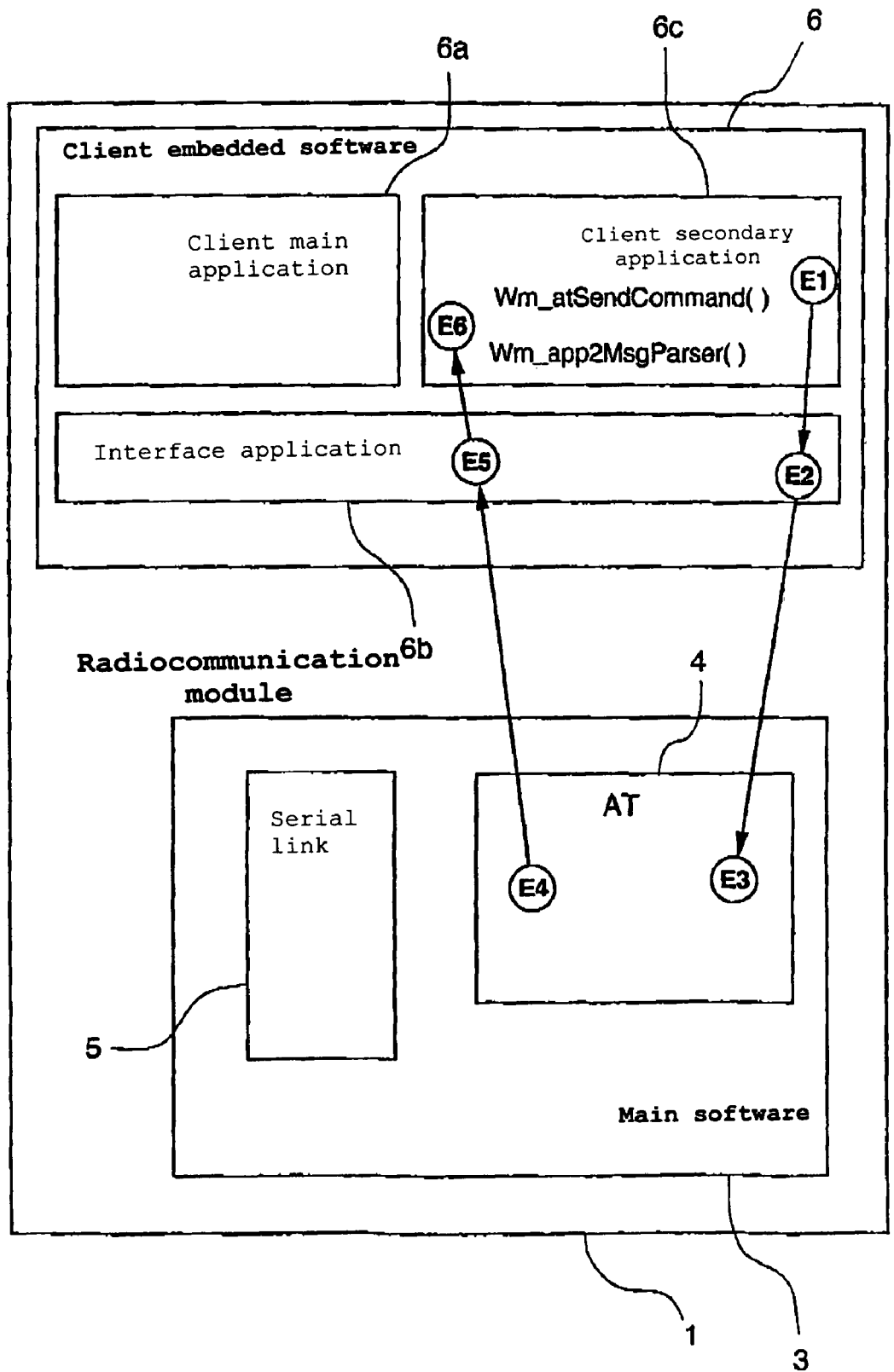
FIG. 6 shows an example of processing (sending a command and receiving the corresponding response) that could be done by the client secondary application, if the radiocommunication module operates according to a first embodiment of the invention in which the client embedded software acts as a client driving software.

We will now describe an example of processing that can be done by the client secondary application, to release the client main application 6a, with reference to FIG. 6.

In this example, it is assumed that:
the radiocommunication module operates according to a first embodiment of the invention, in which the client embedded software acts as the client driver software;
the processing consists of the client secondary application 6c sending a command and receiving the corresponding response;
the client secondary application 6c was initialised and subscribed to the service for sending messages from the main software 3 (see FIG. 4);
at the time of the subscription, the client secondary application 6c gave "wm_app2MsgParser( )" as the message reception source function.

Operation of this processing example can be summarized as follows:

step "1": the secondary application 6c calls a source function to send one or several AT commands to the main software 3, so that the main software can execute them (therefore, an "AT command processing" is done). This source function ("wm_atSendCommand") is described in detail in the remainder of the description;

step "2": the interface application 6a calls the appropriate execution function(s), called the AT command processing functions, within the execution means 4 included in the main software 3;

step "3": the execution means 4 execute the AT command(s);

step "4": after execution, the execution means 4 send the AT response(s) to the client secondary application 6c (if the sending source function was configured to do this);

step "5": this or these responses are sent to the client secondary application 6c, through the interface application 6a;

step "6": the source reception and processing function "wm_app2MsgParser( )" processes the response, within the client secondary application 6c. This source function is the function that the client secondary application 6c named during registration for reception of messages originating from the main software 3. The message that contains the above mentioned response(s) is a parameter of this source reception and processing function.

Note that FIG. 6 described above is transposed from FIG. 3 in the French patent application No. FR 0103909 deposited by the applicant (Wavecom company) on Mar. 22, 2001. The only difference is that the client secondary application is involved in this case (instead of the client embedded application in patent application No. FR 0103909).

A second embodiment of the invention is also provided in which the client embedded software acts as the client supervision software. In this case, the client secondary application may for example perform the following processing:

use of a command preparsing mechanism, enabling the client secondary application to filter or spy commands originating from the client external software;

use of a response preparsing mechanism, enabling the client secondary application to filter or spy responses sent to a client external software.

We will not describe these examples of processing done by the client secondary application in more detail (not shown in the figures), in the case in which the radiocommunication module operates according to the second embodiment of the invention mentioned above.

However, it should be noted that an explanatory text and figures related to the implementation of the two preparsing mechanisms mentioned above (for commands and responses) by the client secondary application, can be obtained by making the following transposition:

start from FIGS. 4 to 7 in French patent application No. FR 0103909 mentioned above and the corresponding explanatory text, and, consider that the client secondary application is involved (instead of the "client embedded application" in patent application No. FR 0103909).

Appendix 1 contains a detailed presentation of some source functions on which the client main application 6a and the client secondary application 6c are based.

Optionally, for the purposes of this invention, it is also possible to use at least one of the following additional AT commands in addition to standard AT commands:

command to load a client software (AT+WDWL) to enable the client external software to load a new client software, or a new part of the client software, into the radiocommunication module;

deactivate command (AT+WOPEN) enabling the client external software to deactivate the client embedded software or part of the client embedded software.

APPENDIX 1

Detailed Presentation of Some Source Functions on Which the Client Main Application and the Client Secondary Application are Based A1) "wm_apmAppliInit":

Function to initialise the client main application; this function is called when the radiocommunication module is started.

Exact Name:
Void wm_apmAppliInit (wm_apmInitType_e InitType)

Parameters:
InitType
This parameter determines what starts the initialisation, the values are:
Typedef Enum

```
{
    WM_APM_POWER_ON
    WM_APM_REBOOT_FROM_EXCEPTION
}   wm_apmInitType_e;
```

WM_APM_POWER_ON

Normal start
WM_APM_REBOOT_FROM_EXCEPTION
    The module is restarted after an exception.

A2) "wm_osMsgParserSubscribe( )":

Function to register a client application (main or secondary) with the main software to a service for reception of messages originating from the main software. The main software memorises this function and uses it whenever it has something to transmit to the client application concerned (main or secondary).

Exact Name:
Void wm_osMsgParserSubscribe (void *SubscribeFunction) (wm_apmMsg_t*)

Parameters:
SubscribeFunction (wm_apmMsg_t*): function provided by the caller (client main or secondary application) so that the main software can send messages to it. A prototype of this function provided is described below ("wm_apmAppliParser" for the client main application, or "wm_app2MsgParser" for the client secondary application).

Return Value:
The return parameter indicates if the subscription was accepted (TRUE) or not (FALSE).

A3) "wm_osMsgParserUnsubscribe( )":

Function to stop registration of a client application (main or secondary) with the main software to a service for reception of messages originating from the main software. The main software forgets the previously memorized function.

Exact Name:
Bool
wm_osMsgparserUnsubscribe(void(*SubsFunction) (wm_apmMsg_t *))

Parameters:

SubsFunction(wm_apmMsg_t*): function provided by the caller (main or secondary client application) so that the main software can send messages to it. This function must be the same as the function given during subscription to this service, otherwise the subscription will not be stopped.

Return Value:

The return parameter indicates if the subscription was stopped (TRUE) or not (FALSE).

A4) "wm_app2Pipe(FunctionType function, . . . )":

Prototype of the function to be provided by the client secondary application to the client main application to be able to dialogue with it. This function has variable arguments, and the number and type or arguments depend on the first "function" parameter.

Exact Name:

Void wm_app2Pipe(FunctionType function, . . . );

Parameters:

Function: requested function. This function implies the number and type of parameters as follows. Some values are reserved (for example 0 to 127), and others (for example 128 to 255) are left free for use by particular dialogues between the client main application and the client secondary application.

A4-1) Variable parameters for function=WM_APP_FUNCTION_INIT:

```
Void wm_app2Pipe   (
FunctionType_t function,
InitType_t Init,
Void      (*MainAppDialogFunction) (wm_apmMsg_t*)
Void      *(*SecondaryAppDialogFunction) (wm_apmMsg_t*),
);
```

The secondary application must be initialised and must perform its processing.

InitType_t Init: the initialisation type (APM_INIT POWER On or APM_INIT REBOOT)

Void (*Main AppDialogFunction)(wm_apmMsg_t*): address of the function that the client secondary application must use to send messages to the client main application. If the client main application does not require this function, it sends a NULL value.

Void *(*SecondaryAppDialogFunction) (wm_apmMsg_t*): The client secondary application must give the address of the function that it provides to the client main application. If the client secondary application does not provide this function, it must set the value to NULL.

A4-2) Variable parameters for function=WM_APP_FUNCTION_STOP:

```
Void wm_app2Pipe
FunctionType_t function,
);
```

The client secondary application must stop its processing, unsubscribe from all its subscriptions and release all resources used.

A5) "wm_apmAppliParser"

Prototype of the source function that the client main application must provide to receive messages originating from the main software. The message forming a parameter of this processing function (also called the "reception" function) in particular contains an AT command or a response to an AT command.

It will be noted that everything that is described below is also applicable to the source function, in which the client secondary application would like to receive messages originating from the main software. All that changes is the function name itself (for example "wm_app2MsgParser" instead of "wm_apmAppliParser").

Exact Name:
Bool wm_apmAppliParser(wm_apmMsg_t*Message);

Parameters:
Message

The message structure is different for each type of received message:

```
Typedef struct
{
  S16   MsgTyp;
  /* "MsgTyp" is a received message type to determine
  the associated structure of the message body */
  wm_apmBody_t   Body;   /* "Body" is a specific
  message body */
} wm_apmMsg_t;
Values of "MsgTyp":
```

WM_AT_SEND_RSP
The message contains a response to an AT command previously sent to the main software by the client embedded software WM_AT_UNSOLICITED
The message contains an unsolicited AT command WM_AT_CMD_PRE_PARSER
The message contains an AT command sent by a client external software through the main software.

WM_AT_RSP_PRE_PARSER
The message contains an AT response resulting from the main software executing an AT command originating from an external application.

WM_OS_TIMER
The message is sent on expiration of a timeout
The structure of the body is:

```
typedef union
{
  /* The following includes all specific structures
  associated with "MsgTyp" */ message types
  /* WM_AT_SEND_RSP */
    wm_atResponse_t           ATResponse;
  /* WM_AT_UNSOLICITED   */
    wm_atUnsolicited_t         ATUnsolicited;
  /* WM_AT_CMD_PRE_PARSER          */
  wm atCmdPreParser_t          ATCmdPreParser;
  ;/* WM_AT_RSP_PRE_PARSER       */
  wm_atRspPreParser_t          ATRspPreParser
  /* WM_OS_TIMER                  */
  wm_osTimer_t      OSTimer;
} wm_apmBody_t;
```

Substructures of the body are as follows:

```
Body for WM_AT_SEND_RSP:
    typedef struct {
        wm_atSendRspType_e    Type;
        u16                   StrLength; /* Length of strData */
        char                  StrData[1]; /* AT response
        */
    } wm_atResponse_t;
    typedef enum {
        WM_AT_SEND_RSP_TO_EMBEDDED,
        WM_AT_SEND_RSP_TO_EXTERNAL,
        WM_AT_SEND_RSP_BROADCAST
    } wm_atSendRspType_e;
    (see details of the "wm_atSendCommand" function for
    the description of "wm_atSendRspType_e description
    ").
Body for WM_AT_UNSOLICITED:
    typedef struct {
        wm_atUnsolicited_e    Type;
        u16                   StrLength;
        char                  StrData[1];
    } wm_atUnsolicited_t;
    typedef enum     {
        WM_AT_UNSOLICITED_TO_EXTERNAL,
        WM_AT_UNSOLICITED_TO_EMBEDDED,
        WM_AT_UNSOLICITED_BROADCAST
    } wm_atUnsolicited_e;
    (see details of the "wm_atUnsolicitedSubscription"
    function for the description of "wm_atUnsolicited_e
    ").
Body for WM_AT_CMD_PRE_PARSER:
    typedef struct     {
        wm_atCmdPreSubscribe_e   Type;
        u16                      StrLength;
        char                     StrData[1]
    } wm_atCmdPreParser_t;
    typedef enum     {
        WM_AT_CMD_PRE_WAVECOM_
        TREATMENT, /* Default value
        */
        WM_AT_CMD_PRE_EMBEDDED_TREATMENT,
        WM_AT_CMD_PRE_BROADCAST
    } wm_atCmdPreSubscribe_e;
    (see details of the "wm_atRspPreParserSubscribe"
    function  for   the    description   of
    "wm_atCmdPreSubscribe_e").
Body for WM_AT_RSP_PRE_PARSER:
    typedef struct {
        wm_atRspPreSubscribe_e   Type;
        u16                      StrLength;
        char                     StrData[1];
    } wm_atRspPreParser_t;
    typedef enum     {
        WM_AT_RSP_PRE_WAVECOM_
        TREATMENT /* Default value
        */
        WM_AT_RSP_PRE_EMBEDDED_TREATMENT,
        WM_AT_RSP_PRE_BROADCAST
    } wm_atRspPreSubscribe_e;
    (see details of the "wm_atRspPreParserSubscribe"
    function  for   the    description   of
    "wm_atRspPreSubscribe_e").
Body for WM_OS_TIMER:
    typedef struct {
        u8                    Ident; /* Timeout identifier
        */
    } wm_osTimer_t;
```

(see details of the "wm_osStartTimer" function for a description of "Ident").

Returned Parameters

The return parameter indicates if the message is processed (TRUE) or not (FALSE).

A6) "wm_atSendCommand"

Function for sending at least one AT command to the main software, in which a parameter indicates the destination application(s) (namely the client embedded application (main or secondary) and/or the client external application) of the response resulting from execution of this AT command.

Exact Name:

```
Void wm_atSendCommand (u16              AtStringSize
                       wm_atSendRspType_e Responsetype,
                       char              *AtString,);
```

Parameters:
AtString
This parameter may be any type of string of AT command using ASCII characters. Several strings may be sent at the same time.

AtStringSize
Size of the previous parameter: AtString.

ResponseType
Response type

```
Typedef enum     {
    WM_AT_SEND_RSP_TO_EMBEDDED, /* Default value */
    WM_AT_SEND_RSP_TO_EXTERNAL,
    WM_AT_SEND_RSP_BROADCAST
} wm_atSendRspType_e;
```

WM_AT_SEND_RSP_TO_EMBEDDED
All responses are redirected to the client embedded application (main or secondary). This is the default mode.
WM_AT_SEND_RSP_TO_EXTERNAL
All responses are redirected to the client external application (PC).
WM_AT_SEND_RSP_BROADCAST
All responses are redirected (broadcast) to the client embedded application (main or secondary) and the client external application (PC).

A7) "wm_AtUnsolicitedSubscription"

Registration function with the main software to a service for reception of unsolicited AT commands, in which one parameter indicates the destination application (namely the client embedded application (main or secondary) and/or the client external application), to which each of the unsolicited AT commands must be redirected.

Exact Name:
Void  wm_atUnsolicitedSubscription(wm_atUnsolicited_e Unsolicited);

Parameters:
Unsolicited
This parameter describes actions carried out when an unsolicited AT command arrives.

```
Typedef enum
    WM_AT_UNSOLICITED_TO_EXTERNAL,   /* Default value
    */
    WM_AT_UNSOLICITED_TO_EMBEDDED,
    WM_AT_UNSOLICITED_BROADCAST,
} wm_atUnsolicited_e;
```

WM_AT_UNSOLICITED_TO_EXTERNAL
All unsolicited commands will be redirected to the client external application (PC) (default mode).
WM_AT_UNSOLICITED_TO_EMBEDDED
All unsolicited commands will be redirected to the client embedded application (main or secondary).
WM_AT_UNSOLICITED_BROADCAST
All unsolicited commands will be redirected (broadcast) to the client external application (PC) and the client embedded application (main or secondary).

A8) "wm_atCmdPreParserSubscribe"
Registration function with the main software to an AT command preparsing service, in which a parameter indicates the destination application(s) (namely the client embedded application (main or secondary) and/or the main application) to which each AT command originating from an external application must be directed.

Exact Name:
Void wm_atCmdPreParserSubscribe (wm_atCmdPreSubscribe_e SubscribeType);

Parameters
SubscribeType
This parameter describes the action carried out when an AT command arrives

```
Typedef enum
    WM_AT_CMD_PRE_WAVECOM_
    TREATMENT,  /* Default value
    */
    WM_AT_CMD_PRE_EMBEDDED_TREATMENT,
    WM_AT_CMD_PRE_BROADCAST,
} wm_atCmdPreSubscribe_e;
```

WM_AT CMD_PRE WAVECOM_TREATMENT
The client embedded application (main or secondary) does not want to filter (or spy) commands sent by the client external application (default mode).
WM_AT_CMD_PRE_EMBEDDED_TREATMENT
The client embedded application (main or secondary) wants to filter commands sent by the client external application.
WM_AT CMD_PRE BROADCAST
The client embedded application (main or secondary) wants to spy commands sent by the client external application.

A9) "wm_atRspPreParserSubscribe"
Registration function with the main software to an AT response preparsing service, in which a parameter indicates the destination application(s) (namely the client embedded application (main or secondary) and/or the client external application) to which each AT command originating from an external application must be directed.

Exact Name:
Void wm_atRspPreParserSubscribe (wm_atRspPreSubscribe_e SubscribeType);

Parameters
SubscribeType
This parameter describes the action carried out when an AT command arrives

```
Typedef enum
    WM_AT_RSP_PRE_WAVECOM_TREATMENT, /* Default value
    */
    WM_AT_RSP_PRE_EMBEDDED_TREATMENT,
    WM_AT_RSP_PRE_BROADCAST,
} wm_atRspPreSubscribe_e;
```

WM_AT_RSP_PRE_WAVECOM_TREATMENT
The client embedded application (main or secondary) does not want to filter (or spy) responses sent to the client external application (default mode).
WM_AT_RSP_PRE_EMBEDDED_TREATMENT
The client embedded application (main or secondary) wants to filter responses sent to the client external application.
WM_AT_RSP_PRE_BROADCAST
The client embedded application (main or secondary) wants to spy the response sent to the client external application.

A10) "wm_atSendRspExternalApp"
Function to send at least one response to the client external software, through the main software. This function can only be used if a prior registration has been made to the response preparsing service, in particular including redirection of a copy of responses to the client embedded application (main or secondary).

Exact Name:
Void wm_atSendRspExternalApp (u16 AtStringSize, Char *AtString,);

Parameters:
AtString
May be any type of AT response string, in ASCII characters.

AtStringSize
Size of the previous parameter: AtString

A11) "DataFlowService"
Function to send and/or receive data by the client embedded application (main or secondary), through the main software, after a data communication has been set up.

A12) "wm_osStartTimer"
Function to start a timeout, a parameter of the said starting function indicating which timeout is to be started.

A13) "wm_osStopTimer"
Function to stop a timeout, a parameter of the said stop function indicating which timeout is to be stopped.

The invention claimed is:
1. Radiocommunication device comprising:
a processor and memory hosting and executing a main software application that in particular performs radiocommunication functions, the main software application comprising means of executing driver commands sent to the main software application by at least one client driver software application and belonging to a predetermined set of driver commands,
wherein the processor and memory of the radiocommunication device also host and execute at least one client embedded software application, comprising a client main application and at least one client secondary application, slave of the client main application, the processing done by the client embedded software application being distributed between the client main application and the at least one client secondary application, and wherein the client embedded software application and the main software application comprise means of enabling the client embedded software application to perform at least one of the following two roles when executed by the processor:

the role of a client driver software application sending driver commands to the main software application, and receiving responses from the main software application resulting from the execution of some of the driver commands; and the role of a client supervision software application, managing execution of driver commands sent by a client driver software application, called the client external software application, hosted on and executed by terminal equipment cooperating with the radiocommunication device.

2. Radiocommunication device according to claim 1, wherein the client software application comprises a binary file containing the client main application and the at least one client secondary application.

3. Radiocommunication device according to claim 1, wherein the client software application comprises a first binary file containing the client main application and at least a second binary file, each containing at least one client secondary application.

4. Radiocommunication device as claimed in claim 1, wherein the following features are provided to enable the client embedded software application to act as client driver software application:

the client embedded software application comprises means of sending driver commands to execution means included in the main software application;

the main software application comprises means of sending responses resulting from the execution of some driver commands by the execution means included in the main software application, to the client embedded software application;

the client embedded software application comprises means of processing responses sent to it by the main software application.

5. Radiocommunication device as claimed in claim 1, wherein the following features are provided to enable the client embedded software application to act as the client supervision software application:

the main software application comprises means of preparsing commands as a function of a determined preparsing policy, so as to transmit driver commands from the client external software application to the client embedded software application and/or to execution means contained in the main software application;

the client embedded software application includes means of processing driver commands switched to it by the preparsing means.

6. Radiocommunication device according to claim 5, wherein the client embedded software application comprises means of selecting the preparsing policy applied by the preparsing means, among a set of preparsing policies as:

driver commands originating from the client external software application are sent only to execution means within the main software application;

driver commands originating from the client external software application are sent only to the client embedded software application;

driver commands originating from the client external software application are sent to the execution means included in the main software application and to the client embedded software application.

7. Radiocommunication device as claimed in claim 5, wherein the command processing means take at least one decision for each command, belonging to the group including:

send the driver command to the execution means included in the main software application, the client embedded software application comprising means of sending driver commands to the execution means for this purpose;

supply or do not supply a response, only as a function of at least one item of information about the command, without executing the command, the client embedded software application comprising means of sending the response to the client external software application for this purpose through the main software application.

8. Radiocommunication device as claimed in claim 1, wherein, in order to enable the client embedded software application to act as the client supervision software application:

the main software application comprises means of preparsing responses as a function of a determined response preparsing policy, so as to transmit responses resulting from the execution of some driver commands by execution means included in the main software application, to the client embedded software application and or to the client external software application;

the client embedded software application comprises means of processing responses switched to it by the response preparsing means.

9. Radiocommunication device according to claim 8, wherein the client embedded software application comprises means of selecting the response preparsing policy applied by the response preparsing means, among a set of response preparsing policies as:

responses originating from execution means are transmitted only to the client external software application;

responses originating from execution means are transmitted only to the client embedded software application;

responses originating from execution means are transmitted to the client embedded software application and to the client external software application.

10. Radiocommunication device as claimed in claim 1, wherein it is included within a device belonging to the following group:

radiocommunication terminals;

devices other than radiocommunication terminals necessitating a wireless communication feature;

modems.

11. Radiocommunication device as claimed in claim 1, wherein the main software application comprises at least one main application associated with a set of execution functions, each enabling the execution of at least one of the driver commands, in that each of the client main and secondary applications is associated with a set of source functions, each enabling sending or receiving driver commands or responses to driver commands, to or from the main application, and wherein the main software application and/or the client embedded software application comprise an application interface used to interface the source functions with the execution functions.

12. Radiocommunication device according to claim 11, wherein the set of source functions associated with the client main application in particular comprises a client main application initialisation source function that is called when the radiocommunication device is started.

13. Radiocommunication device according to claim 12, wherein the set of source functions associated with the client main application comprises a source function for subscription to a service for sending messages originating from the main software application and wherein, at the time of this subscription, the client main application sends the address of a message processing source function in which the client main application would like to receive messages from the main software application, to the main software application.

14. Radiocommunication device as claimed in claim 11, wherein the set of source functions associated with the client secondary application comprises a source function for initialisation of the client secondary application that is called by the client main application.

15. Radiocommunication device according to claim 14, wherein the set of source functions associated with the client secondary application comprises a source function for subscription to a service for sending messages originating from the main software application and wherein, at the time of this subscription, the client secondary application sends the address of a source message processing function to the main software application, in which the client secondary application would like to receive messages originating from the main software application.

16. Radiocommunication device as claimed in claim 14, wherein the source initialisation function of the client secondary application comprises at least one parameter enabling the use of a dialogue mechanism between the client main application and the client secondary application.

17. Radiocommunication device as claimed in claim 14, wherein the set of source functions associated with the client secondary application also comprises a source function for stopping the client secondary application that is called by the client main application.

18. Radiocommunication device as claimed in claim 14, wherein the set of source functions associated with the client secondary application comprises a source function for unsubscription from the service for sending messages originating from the main software application.

19. Radiocommunication device as claimed in claim 13, wherein the message is a parameter of the source function processing a message from the main software application, and in that the structure of the message forming the parameter comprises:

a first field containing information related to the type of the message;

a second field containing the specific body of the message.

20. Radiocommunication device according to claim 19, wherein the message type belongs to the group comprising:

message containing a response to a driver command previously sent to the main software application by the client embedded software application;

message containing an unsolicited driver command;

message containing a driver command sent by a client external software application through the main software application;

message containing a response resulting from execution of a driver command sent by the client external software application, by the main software application;

message sent on expiration of a timeout.

21. Radiocommunication device as claimed in claim 11, wherein the sets of source functions associated with the client main application and the client secondary application also comprise at least a source function belonging to the following group:

a function for sending at least one driver command to the main software application, a first parameter of the sending function being the at least one driver command, a second parameter of the sending function indicating the application(s) to which the response resulting from execution of the driver command is sent, namely the client main application and/or the client secondary application in the client embedded software application, and/or a client external application included in the client external software application;

a registration function with the main software application to a service for reception of unsolicited driver commands, one parameter of the registration function indicating the application(s) to which each of the unsolicited driver commands is to be redirected, namely the client main application and/or the client secondary application included in the client embedded software application, and/or a client external application included in the client external software application;

a registration function with the main software application to a driver command preparsing service, in which a parameter of the registration function indicates the destination application(s) namely the client main application and/or the client secondary application included in the client embedded software application and/or the main software application to which each driver command originating from the client external software application must be directed;

a registration function with the main software application to a response preparsing service, in which a parameter of the registration function indicates the destination application(s) namely the client main application and/or the client secondary application included in the client embedded software application and/or a client external application included in the client external software application to which each response resulting from the execution of a driver command by the main software application must be directed;

a function for sending at least one response to the client external software application, through the main software application, a parameter of the sending function being the at least one response.

22. Radiocommunication device as claimed in claim 1, wherein the client embedded software application and the main software application each use a distinct part of a RAM, and an attempt by one of the two software application programs to access part of the RAM reserved for the other software application will stop operation.

23. Radiocommunication device as claimed in claim 1, wherein the set of driver commands is a set of standard AT commands.

24. Radiocommunication device according to claim 23, wherein the set of driver commands comprises an additional AT command for loading a client software application enabling the external client software application to load a new client software application or a new part of the client software application into the radiocommunication device, in addition to standard AT commands.

25. Radiocommunication device as claimed in claim 23, wherein the set of driver commands comprises an additional AT command called the deactivate command enabling the client external software application to deactivate the client embedded software application or part of the client embedded software application, in addition to standard AT commands.

26. Process for implementing a client software application for driving a radiocommunication device, the process comprising:

hosting and executing a main software application on the radiocommunication module, wherein the main software application performs radiocommunication functions, wherein the main software application executes driver commands sent to the main software application by the client driver software application and belonging to a predetermined set of driver commands, hosting and executing on the radiocommunication module at least one client embedded software application comprising a client main application and at least one client secondary application, slave of the client main application, the processing done by the client embedded software application being distributed between the client main application and the at least one client secondary application, and wherein the client embedded software application and the main software application enable the client embedded software application to perform at least one role of a group of roles comprising:

the role of the client driver software application sending driver commands to the main software application, and receiving responses from the main software application resulting from the execution of some of the driver commands;

the role of a client supervision software application, managing execution of driver commands sent by the client driver software application, the client driver software application called the client external software application being hosted on and executed by terminal equipment cooperating with the radiocommunication device.

\* \* \* \* \*

UNITED STATES PATENT AND TRADEMARK OFFICE
CERTIFICATE OF CORRECTION

PATENT NO. : 7,653,382 B2 Page 1 of 1
APPLICATION NO. : 10/472333
DATED : January 26, 2010
INVENTOR(S) : Jacques Montes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1183 days.

Signed and Sealed this

Twenty-third Day of November, 2010

David J. Kappos
*Director of the United States Patent and Trademark Office*